ELECTRONICALLY CONTROLLED TUNER

Filed July 5, 1947 3 Sheets-Sheet 1

Inventors
Bertram A. Schwarz &
James H. Guyton
By Spencer, Willits, Helwig & Baillio
Attorneys April 24, 1951 B. A. SCHWARZ ET AL 2,550,430

ELECTRONICALLY CONTROLLED TUNER

Filed July 5, 1947 3 Sheets-Sheet 2

Inventors
Bertram A. Schwarz &
James H. Guyton
By Spencer, Willits, Helwig & Baillio
Attorneys

ELECTRONICALLY CONTROLLED TUNER

Inventors
Bertram A. Schwarz &
James H. Guyton
By Spencer, Willits, Helwig & Baillio
Attorneys Patented Apr. 24, 1951

2,550,430

UNITED STATES PATENT OFFICE 2,550,430

ELECTRONICALLY CONTROLLED TUNER

Bertram A. Schwarz and James H. Guyton, Kokomo, Ind., assignors to General Motors Corporation, Detroit, Mich., a corporation of Delaware Application July 5, 1947, Serial No. 759,042

13 Claims. (Cl. 250—40)

This invention relates broadly to means for automatically tuning a radio receiver and more particularly to means for activating the tuning means of the receiver controlled automatically by the strength of the incoming signal itself.

Present commercial receivers are very prone to use some type of so-called "automatic tuning" means or push button controls. Most of these controls are mechanical and require a preadjusted setting of the mechanism and then when they have been so set are only capable of tuning again to that exact mechanical setting, which of course represents a frequency of reception.

In automotive radio receivers particularly, the problem of either resetting the buttons to a new station or using the regular manual rotary knob arises as the locale of operation of the receiver changes and different stations operating at different frequencies are available.

If some means could therefore be provided to tune a receiver to receive a certain station that would not be determined by a mere mechanical repetitive action, which in reality has no direct connection with the signal, but which is operated by the signal strength itself, then no station would be tuned in on the receiver except those transmitting a signal in excess of a predetermined strength and no prearranged setting would have to be made.

It is therefore an object of our invention to provide a means for tuning radio equipment controlled by the transmitted signal strength.

It is a further object of our invention to provide means for scanning a predetermined frequency spectrum and control means therefor operated by the received signal strength.

It is a still further object of our invention to provide a spectrum scanning means with control means for stopping the scanning means on certain received signals if the said signals are above a certain value.

It is a still further object of our invention to provide remote control means for tuning radio apparatus which does not require visual attention.

It is a still further object of our invention to provide tuning means which does not require mechanical presetting or manual control and therefore the radio apparatus may be placed at any desired location with the controls only available to the operator.

With these and other objects in view which will become apparent as the specification proceeds, our invention will be best understood by reference to the following specification and claims and the illustrations in the accompanying drawings, in which:

Figure 1:
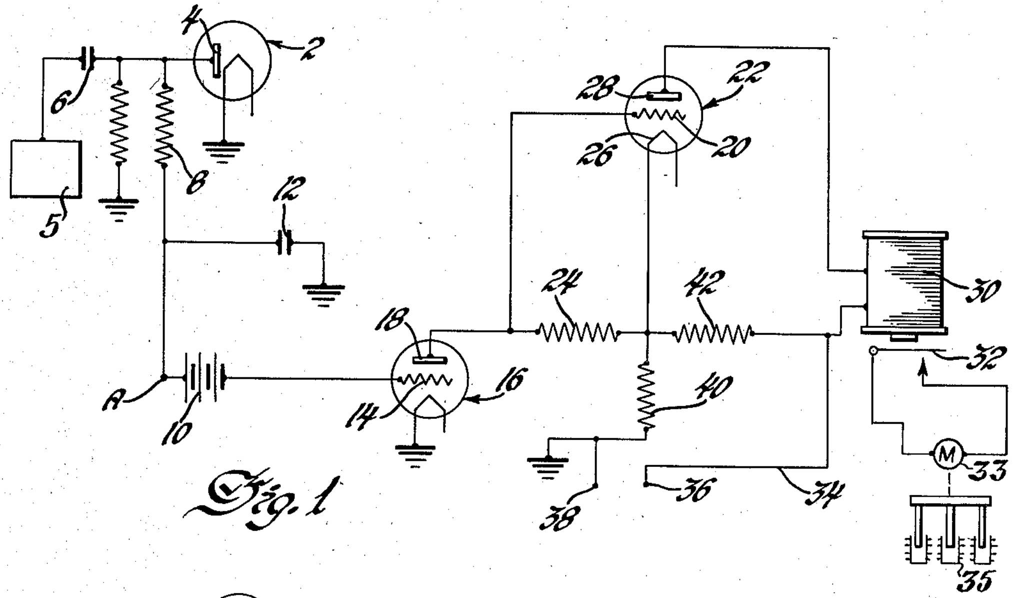
Figure 1 is a circuit diagram of a control circuit for a tuning motor operating by signal strength of the incoming signal.

In providing this type of tuning means it is essential to have a tuning motor which drives the tuning means, such as a rotary condenser, throughout its normal travel to scan a desired frequency band. Therefore, there is a series of mechanical parts connected together that are moving during the scanning process and these have inertia. When this mechanism receives some control signal to tend to cause it to cease further movement, it is desired that such movement stop as quickly as possible so that the tuner will not overshoot the station. In order to provide such action, the motor rotor is made as small and light as possible and usually some declutching means is provided to separate the rotor from the driven mechanism as soon as the motor is deenergized. If relays are used in the control system, they must be capable of rapid actuation.

Since it is difficult to adjust and maintain these fast acting relays and declutching motors over a long period of time, and to reduce the strict requirements consistent with stopping time which are imposed on the mechanical parts for accurate tuning, a further feature of our invention provides a device for allowing the tuner to proceed if the stopping signal from the receiver is not maintained for a reasonable length of time. In other words, if a stopping signal is given and for some reason the mechanical system fails to stop on signal but instead stops beyond the signal, the tuner will proceed to the next signal of sufficient strength to operate the system. This is accomplished by the use of a time delay circuit which eliminates inaccuracies that might be introduced by variables in the system such as stopping time of the mechanical system, production variation of resistors and condensers and such others as may be introduced by production. With this system these variations slightly affect the signal sensitivity of the tuner and not the accuracy thereof.

The main control voltage for our system is provided by the automatic volume control line or AVC which it is customary to provide in most modern radio receivers and which is essential to automotive radio receivers, inasmuch as in automotive use the incoming signals are more prone to vary considerably. The automatic volume control voltage is supplied by the detector stage and fed back to one of the radio frequency stages in inverse phase so that as the incoming signal tends to increase, the feed back will tend to reduce this effect and the result is that the signal will remain of fairly constant magnitude at the audio portion of the receiver. A system of this general character is shown in the patent to Evans #1,869,323. It will be obvious that as a station is brought into tune that the incoming signal will rise sharply in amplitude and therefore the signal fed back through the automatic volume control circuit will increase. If some means is provided to cause the tuning means to operate to scan the broadcast band then this signal in the automatic volume control circuit can be used to stop the tuning means on station. This is the general signal used to stop the scanning means but specifically a broad resonance curve is provided on the AVC response and the AVC voltage is delayed, the triggering of the relay circuit being accomplished in our preferred form by an additional negative voltage from the audio diode load. This is in general the type of system which will be disclosed herein, only the actual control portion of the circuit being disclosed.

The system shown in Figure 1 discloses the diode 2 in which the AVC signal is generated. The particular tube used in most commercial receivers for detection and AVC is a multi-element, multi-function tube. A very common one to use is a double diode-triode tube in which one of the diode sections is used to provide the AVC signal. Therefore tube 2 in the present instance will diagrammatically illustrate this part. The anode 4 of this section is connected through capacitance 6 back to the radio frequency amplifier 5. A resistance 8 is connected to the anode, the opposite terminal of which is connected to the negative pole of a battery 10 and to ground through capacity 12.

The opposite pole of the battery 10 is directly connected to the control grid 14 of a triode tube 16. The plate 18 of the tube 16 is directly connected to control grid 20 of a second triode 22. A resistor 24 is connected between the grid 20 and filament 26 of this second tube. The plate 28 of tube 22 is connected to the operating coil 30 of a relay which actuates switch contacts 32 for controlling a motor 33 driving tuning means 35. When the switch 32 is closed the tuning motor is energized to cause this receiver to be tuned over the band but when coil 30 is energized the switch 32 is opened and the tuning motor stops. A direct line 34 connects the coil 30 with terminal 36. Terminals 36 and 38 are provided for a power input. A resistor 40 is connected between terminal 38 and the filament 26 and a second resistor 42 between the relay coil terminal and the filament.

When the motor is driving the tuning means and scanning the band, let it be assumed that a station is reached. As it comes in tune, the negative voltage at the AVC diode of the set increases. This is diode 2 in Figure 1. When this negative voltage at anode 4 is sufficient to exceed the voltage of battery 10 the plate current in tube 16 will be reduced and the voltage drop across resistor 24 correspondingly reduced. Since the voltage across resistor 24 is that appearing on the control grid 20 of the tube 22, a reduction of the grid voltage occurs which will increase the flow of current through the tube 22 and the relay coil 30 which is in the plate circuit will therefore be energized to open switch 32 and stop the tuning motor controlled thereby. As before mentioned, the motor is of a type which will stop quickly so as not to overshoot or pass by the station.

The local strong station will, of course, produce more AVC voltage than the distant weaker stations, and since the voltage of the battery 10 determines the voltage at which the system will operate to de-energize the tuning motor, the selection or variation in this voltage will control the series of stations which will be tuned in. With this system also in which tube 16 controls tube 22, the latter is operated at "cut off" or no plate current during tuning. In order to have the tuner pass on to the next station, which produces a sufficient signal to stop the tuner, it is only necessary to momentarily de-energize the tube circuits by some means so that the relay coil 30 will be de-energized, dropping its contact 32 to complete the tuning motor circuit, whereupon the same will start in operation to tune over the band and continue to the next station. This de-energization may be caused by grounding point A, adjacent battery 10, or by a number of other methods. The motor, of course, is provided with reversing means, at each end of its complete travel, so that it continuously scans the band.

Figure 2:
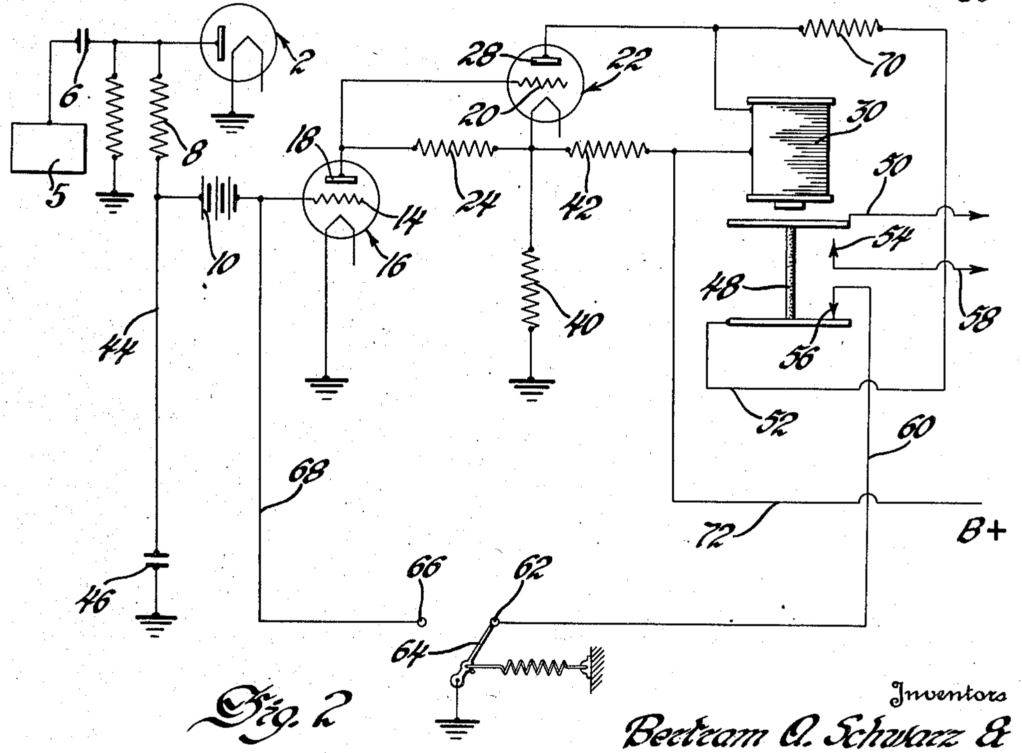
Figure 2 is a modified control circuit embodying our invention.

The modification shown in Figure 2 is quite similar to that shown in Figure 1, but has the added advantage that it provides means so that the tuner will not "jump a station" upon a decrease in signal strength, such, for example, as might happen when a car, upon which a radio receiver is mounted, passes under a bridge or viaduct, the station fades out, and the tuner might not be held on the station to which it is tuned. In the system shown in Figure 2, the stopping signal originates as previously from the diode detector 2, which normally provides the AVC current. This signal is conducted through a resistor 8, as in the previous case, which is connected to line 44, which in turn is connected to condenser 46 and to ground or to battery 10, the opposite terminal of battery 10 being connected to control grid 14 of triode 16, the plate 18 being connected directly to control grid 20 of tube 22. The relay coil 30 in this modification is connected to resistors 42 and 24 in the same manner as before and resistor 40, which is connected to the junction point of the two resistors 24 and 42, is also connected to ground. The plate 28 of tube 22 is connected to the other terminal of the relay coil 30.

However, in this system instead of the relay coil 30 actuating a signal contact arm it operates a connected pair of movable spaced contacts 48 insulated from each other, one of which is connected to line 50 and a second to line 52. Two stationary contacts 54 and 56 cooperate with the movable contactors, the former being connected to line 58 to the motor, and the latter through line 60 to a stationary switch contact 62. A movable contactor 64 is spring biased to close against contact 62 and is grounded. A second stationary contact 66 is provided, which likewise may be engaged by the movable switch arm 64 and this contact is connected through line 68 to the control grid 14 of the tube 16. Line 52 continues to resistor 70 which is connected into the plate circuit of the tube 22. A line 72 connects to a point between the resistor 42 and the relay coil 30, and is connected to the B+ voltage of the receiver. Lines 50 and 58 are connected directly into the tuning motor control circuit.

It will be obvious from the figure that as long as the dual contactor 48 is in the upper position or that shown, that the circuit between lines 50 and 58 is broken, and therefore the tuning motor is at rest. When, however, the contactor is released by the relay coil and descends, then the circuit is completed and the tuning motor operates. As in the case of Figure 1, when the AVC voltage produced by tube 2 overcomes the battery voltage and causes the grid 14 to go negative, the plate current will decrease and the voltage drop across resistor 24 will be reduced, tube 22 will then conduct and relay coil 30 will operate to hold the contactor 48 in the position shown. In this case, however, should there be any tendency for the relay coil 30 to become de-energized by lack of AVC voltage due to the fading of the signal, there is still a holding circuit for the coil 30 from line 72 through the relay coil, resistor 70, contacts 48 and 56, line 60, switch 62 and 64, to ground. Thus, as long as the switch 62 and 64 remains in the spring bias position, the relay coil 30 will remain energized, and the set will remain tuned to that station.

When the switch 64 is moved to contact with the stationary contact 66, however, the holding circuit is broken and at the same time the grid 14 is grounded, producing a biasing voltage for tube 22 across resistor 24. The plate current therefore in tube 22 falls, and no current flows in the relay coil, either through the tube or through the holding circuit and the tuning motor starts. This condition, of course, is maintained as long as switch 64 is held on the left contact and the motor goes back and forth or scans the band until switch 64 is reversed, due to automatic mechanical switch reversals at the end of each horizontal track. When the switch 64 is released, and returns to the position shown, the holding circuit for the relay coil 30 is in condition to be energized as soon as the relay is picked up. However, until a station is approached, the circuit of resistor 70 is still open, and as the strength of the signal increases to reach triggering strength, the motor will continue to operate. However, once the tube 16 is cut off and tube 22 becomes conductive, the relay will of course pick up and stop the motor on that station. Any further change in the AVC voltage from any source whatsoever will have no effect on the tuning means to try to get it to operate until the switch 64 is manually operated.

Figure 3:
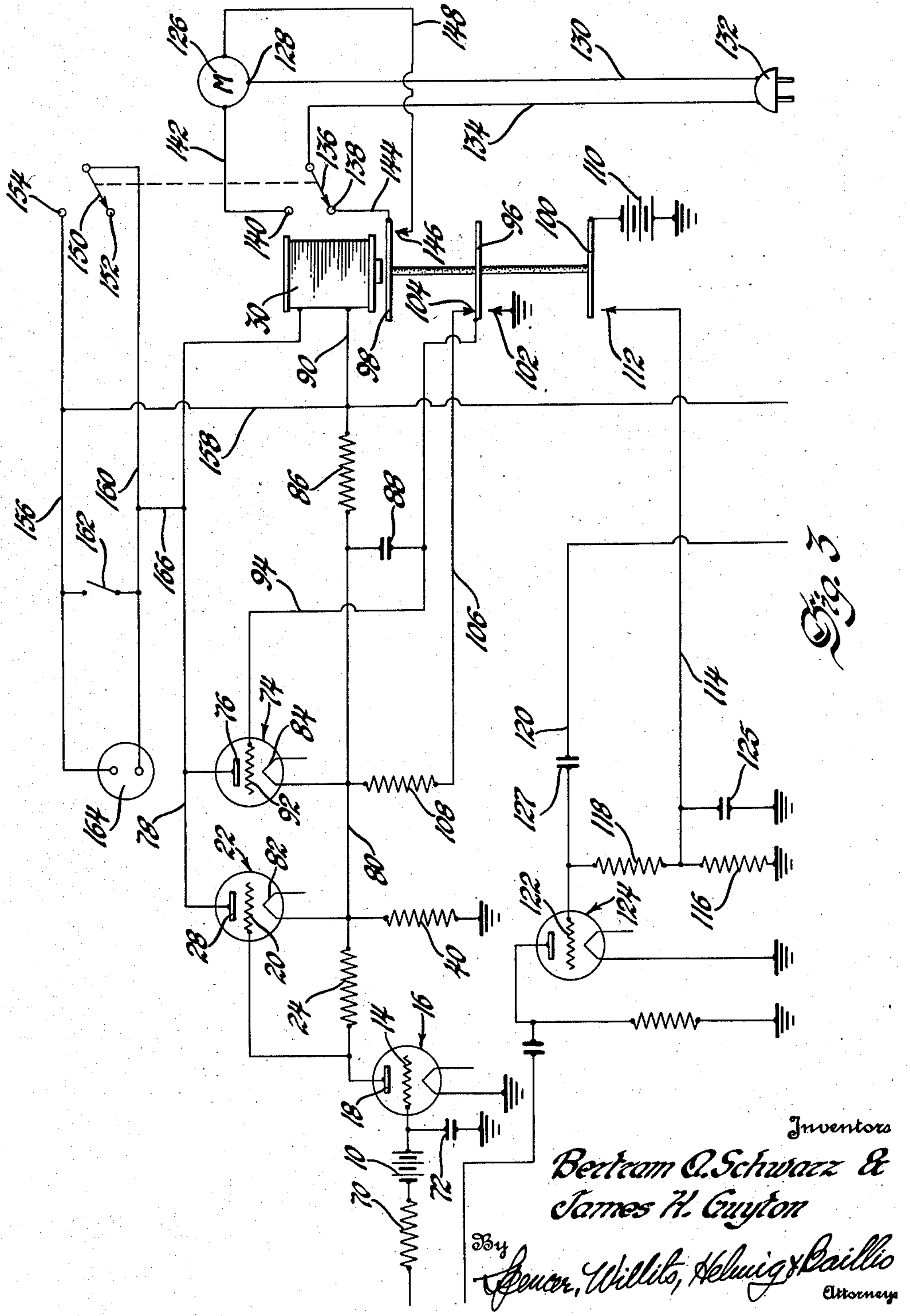
Figure 3 is a circuit diagram of a still further modified control circuit including remote control means.

In Figure 3 the tuner system shown is basically that of Figure 2 with an additional tube and delay circuit. There may be instances where an incoming signal may be substantially at the threshold of signal strength for operation of the tuner, that is, the signal is just about of sufficient strength to trigger the relay to stop the motor. This might cause the tuner to overtravel the proper position. To avoid any such haphazard action, the delay circuit of Figure 3 is added, and the tuner will not be controlled to stop at a weak station near the preset signal threshold but to proceed to the next strong station.

The AVC tube 2 is not shown in Figure 3 but only the first control tube 16, the signal being supplied to the grid 14 through the resistor, condenser combination 10, 12, and sensitivity control battery 10. The plate 18 is, as before, directly connected to grid 20 of tube 22 and resistor 24 is connected between grid 20 and the filament 82 of the tube 22. A third tube 74 is, however, added in this case whose plate 76 is connected to plate 28 of tube 22 by line 78, which also extends to the relay coil 30. A line 80 interconnects the filaments 82 and 84 of the tubes 22 and 74. This line is also connected to one end of resistor 86 and condenser 88. Line 90 extends from resistor 86 to the relay energizing coil 30.

The control grid 92 of the tube 74 is connected through line 94 to the movable contact 96 actuated by the relay coil 30 simultaneously with contacts 98 and 100. Two stationary contacts cooperate with reciprocating contact 96, the first contact 102 being directly grounded and the second contact 104 being connected through line 106 to resistor 108, which is in turn connected to line 80. Movable contact 100, the last of the three, is provided for muting the audio signal as the tuner is adjusted to tune over a range of frequencies either not being broadcast or not being of sufficient amplitude and thus is directly connected to a battery 110 and is adapted to engage a stationary contact 112 which is connected to line 114. The latter is directly connected between two resistors 116 and 118, the opposite terminal of the first resistor being grounded and of the second resistor connected to line 120 and the grid 122 of a triode 124. Condenser 125 is connected between line 114 and ground and condenser 127 is connected in line 120. The output of tube 124 is suitably connected to the receiver so that when this tube is nonconducting, the set will be muted.

The motor for driving the tuning means is shown at 126 and one terminal 128 is connected by line 130 to the plug or connector 132 for the power supply. The other power lead 134 extends to a movable switch contact 136, which engages either of two stationary contacts 138 or 140. Contact 140 is connected to one winding of motor 126 by line 142. Contact 138 on the other hand is connected through line 144 with movable contact 98 actuated by the solenoid 30. This movable contact forms switching means with a stationary contact 146 which is directly connected to a second winding of motor 126 by line 148 to cause the motor to rotate in the opposite direction from that in which it rotates when the winding connected to line 142 is energized.

The movable switch arm 136 is ganged to move simultaneously with movable switch arm 150, as shown by the dotted line between the two, and that arm cooperates with two stationary contacts 152 and 154, the first being a dummy, or open circuit, and the second connected to line 156. A power supply line 158 from a relatively high direct current voltage such as a B battery is connected to line 156. The movable switch arm 150 is connected to line 160. Across lines 156 and 160 there is provided a manually operated switch 162 in parallel with a plug 164 which is available for remote control switching if desired. The gang switches 150—136 are automatically operated by the tuning means at the end of travel, so that the direction of the motor will be reversed. Line 160 is connectel to line 78 by line 166 to apply a signal to the solenoid circuit for manual actuation for changing to the next station.

In the operation of the system shown in Figure 3, the motor 126 is capable of rotation in either direction, and therefore drives the tuning means for the receiver in either direction to scan the broadcast band. It will be noted, however, that when switch 136 is in its upper position to engage contact 140, there is no other switch in that circuit from the power source, and therefore the motor 126 continues to run until the reversing mechanism moves the switch 136 back to contact 138, at which time the motor 126 reverses its direction of rotation and the tuner begins to scan the band in the opposite direction. At this time there is a second switch in series with the motor winding in addition to switch 136—138, namely, switch 98—146, which is operated by the solenoid 30. This provides controlled station selecting drive in one direction, but uninterrupted drive in the opposite direction to start the station scanning from one end only.

As long as the solenoid is de-energized, switch 98—146 will be closed and the motor will continue to scan the band, but when a signal of sufficient strength is received, then the solenoid is energized to pick up its armature, and the switch 98—146 opens to stop the motor on station. This solenoid control is provided through the AVC voltage as before, which is applied to the grid of tube 16, which becomes non-conductive at a predetermined signal strength. This in turn causes the voltage drop developed across resistor 24 to decrease, and the voltage of grid 20 changes, causing tube 22 to become conductive. Previously, this tube has controlled the solenoid action, but in this form of our invention we have added a hold down tube 74 in parallel with tube 22, which tube is controlled by a time delay circuit of resistance 108 and condenser 88. If the tube 74 through its time delay circuit does not become conductive in the rapid passing through a signal, then the tuner will pass on to the next station, and there will be no overtravel or stopping off station. If the tube 74 does become conductive then it holds down the circuit on tune for the station until the manually operated switch is closed to cause de-energization of the relay and the tuner will pass on to the new station. The time delay may, of course, be controlled by selection of the values of resistance 108 and capacity 88. The grid 92 of tube 74 is grounded through switch 96—102 when the solenoid is de-energized, and is connected to the time delay circuit upon energization of relay coil 30 through switch 96—104. The operation of either manual switch 162 or some remote switch connected to plug 164 will cause de-energization of relay coil 30 and the tuner will pass on to the next station.

In this case, the operation of the solenoid has, in reality, three functions; first, it directly controls the energization of motor 126; secondly, it controls the grid 92 of the tube 74; and thirdly, through switch 100—112 and the associated tube 124 it mutes the receiver between stations.

Figure 4:
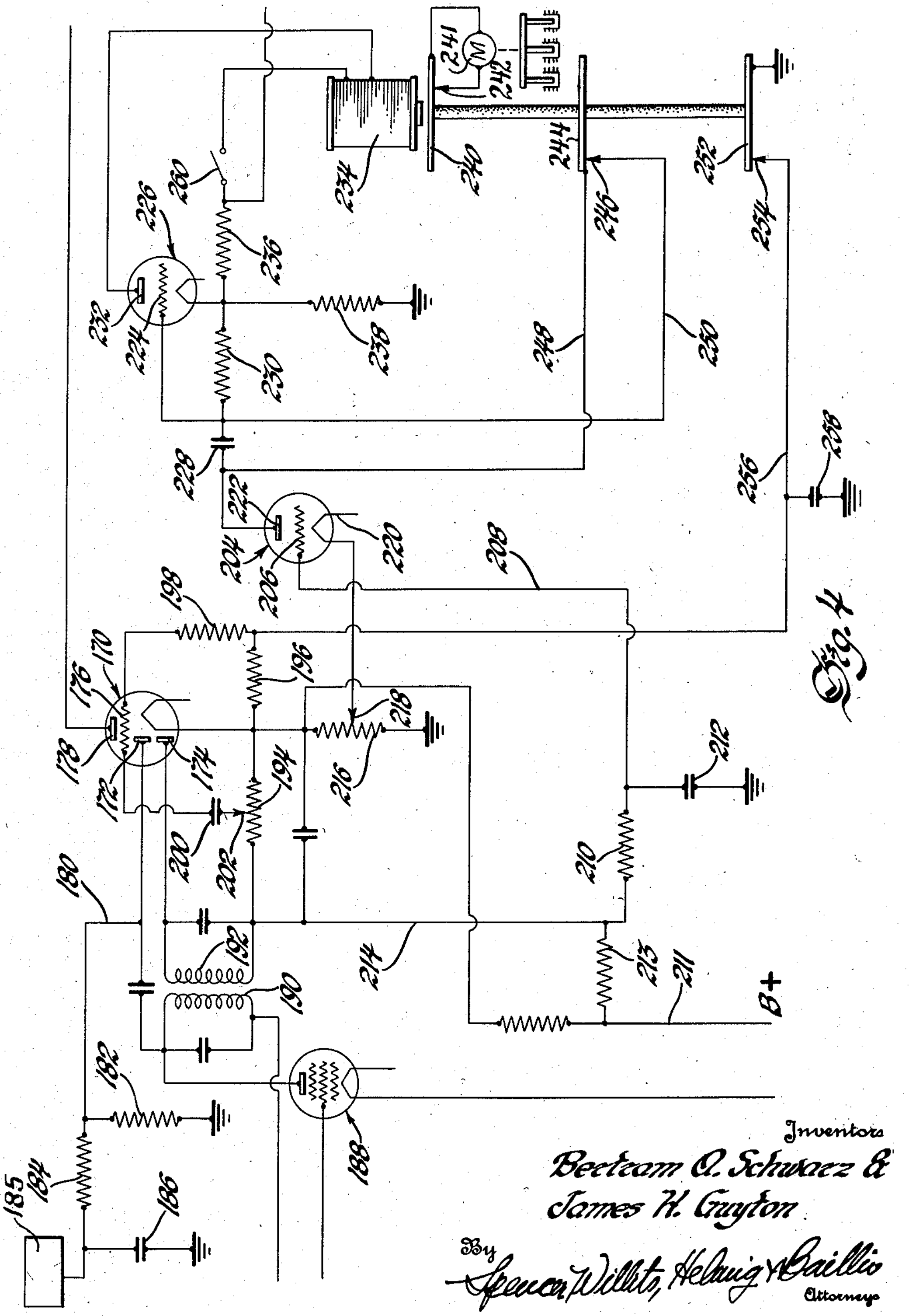
Figure 4 discloses a further modification with more of the receiver circuit shown, in which the control circuit is operated by incoming signal strength.

In Figure 4 we have disclosed a further slightly modified form of signal controlled tuner, but in this instance have illustrated somewhat more of the receiver circuit so that the connection of one of these control systems into the receiver system will be more clear. Tube 170 is a diode-triode tube used as a detector amplifier and AVC signal source. Anode 172 is that used for AVC voltage, anode 174 for detection, and grid plate 176—178 for amplification, the latter being connected to the audio portion of the receiver. The AVC voltage is fed back through line 180 and leakage path 182 and resistor 184 to the radio frequency amplifier 185. Tube 188 provides the input to the detector through coupled tuned circuits 190—192. Resistor 194 is connected between the cathode and resonant circuit 192, and two series resistors 196 and 198 are connected between the cathode of tube 170 and grid 176, the opposite end of grid 176 being connected through condenser 200 to an adjustable contact 202 on the resistance 194.

Tube 204 is a triode and is the first tube of the tuner control circuit corresponding to tube 16 of the previous circuits. The control grid 206 of this tube is connected through line 208 with resistor 210 and condenser 212, the latter being connected to ground. The opposite terminal of the resistor 210 is connected to line 214, which extends to the tuned circuit 192. A high resistance 213 is connected between line 214 and input line 211 from B+. A resistor 216, connected in the cathode to ground lead of tube 170, has a variable tap 218 thereon, which is conductively connected to the cathode 220 of tube 204. The plate circuit 222 of tube 204 is as before connected to the input circuit or grid 224 of the next tube 226, but with this exception that there is interposed in this line a condenser 228, whose purpose will be presently explained. A resistor 230 is connected across the cathode and grid of this tube, and the plate 232 is directly connected to the relay coil 234. The opposite terminal of the coil is connected to manually operable switch 260, then through resistance 236 to the cathode of the tube. A third resistor 238 is connected between cathode and ground.

The relay, as in the construction shown in Figure 3, actuates three sets of contacts, switch 240—242, which controls the motor windings, and thus the operation of the motor 241 per se; contacts 244—246, which control the grid potential through lines 248 and 250; and switch 252—254, which is a muting switch connected through line 256 back to grid 176 of tube 170. Line 256 is grounded through condenser 258, which provides a time delay for the muting or squelch circuit.

This circuit of Figure 4 accomplishes the same result as Figure 3; that is, will not hesitate on signals near the threshold of operation nor overtravel, but accomplishes this without the use of a third tube such as 74 in that figure. The function formerly provided by that tube, namely, the time delay, is now provided by the condenser 228 in the line from plate 222 to grid 234. In the position shown, it may be said to act as a slight signal variation absorber, and the voltage across this condenser may rise to some 10 or 20 volts during the stopping interval before disabling tube 204. Therefore, when tube 204 does become inoperative or lose control for a short time and tube 226 conducts, causing plate current flow from the source through the relay coil, the station will be strong and in tune. The level of signal strength which determines the stations at which the tuner will stop may be adjusted by moving the adjustable tap 218 over the resistor 216. The condenser 228 is shorted by switch 244—246, and the switch 252—254 mutes the set while the motor is tuning it over the band. To cause the set to go on to the next station, manual switch 260 should be closed momentarily.

We claim:

1. In radio receiving apparatus having radio frequency amplifier and detector circuits, a control circuit connected to the detector and to the amplifier for feeding back a portion of the detected signal to the radio frequency amplifier to maintain the output substantially constant, power actuated tuning means to repetitively tune the receiver over a predetermined portion of the frequency spectrum which contains a plurality of desired signals, switching means connected to the power actuated tuning means to control the same, control means connected to said feed back circuit and to the switching means and operated by the signal strength or said feedback circuit to stop the power actuated means on station, said control means including time delay means to prevent stopping operation of said control means for a predetermined time and thus prevent inaccurate stopping on weak stations.

2. In radio receiving apparatus having a radio frequency amplifier and detector circuits, a control circuit connected to the detector and to the amplifier for feeding back a portion of the detected signal to the radio frequency amplifier to maintain the output substantially constant, power actuated tuning means to repetitively tune the receiver over a predetermined portion of the frequency spectrum which contains a plurality of desired signals, switching means connected to the power actuated tuning means to control the same, a multi-element electron tube whose control element is connected to said feed back circuit, biasing means connected between the control element and the feed back circuit and of opposed polarity to that of the signal in the feed-back circuit, a resistance connected in the output circuit of said tube, a second tube whose control element is connected to the output of the first tube and across the resistance, said tube biased to be non-conductive during the tuning cycle but conductive upon cessation of output current in the first tube, relay switching means connected to the output of the second tube controlling the power actuated tuning means so that as the signal increases the first tube will cease conducting when the input bias is overcome by the signal and cause the second tube to start conducting and actuate the relay to stop the tuning means on station.

3. In radio receiving apparatus having a radio frequency amplifier and detector circuits, a control circuit connected to the detector and to the amplifier for feeding back a portion of the detected signal to the radio frequency amplifier to maintain the output substantially constant, power actuated tuning means to repetitively tune the receiver over a predetermined portion of the frequency spectrum which contains a plurality of desired signals, switching means connected to the power actuated tuning means to control the same, a multi-element electron tube whose control element is connected to said feed back circuit, biasing means connected between the control element and the feed back circuit and of opposed polarity to that of the signal in the feed-back circuit, a resistance connected in the output circuit of said tube, a second tube whose control element is connected to the output of the first tube and across the resistance, said tube biased to be non-conductive during the tuning cycle but conductive upon cessation of output current in the first tube, relay switching means connected to the output of the second tube controlling the power actuated tuning means so that as the signal increases the first tube will cease conducting when the input bias is overcome by the signal and cause the second tube to start conducting and actuate the relay to stop the tuning means on station, and time delay means in circuit with the second tube to prevent its becoming conductive immediately upon a decrease in output of the first tube so that the device will not tune inaccurately on weak stations.

4. In radio receiving apparatus, means for tuning the same over a predetermined portion of the frequency spectrum, power actuated means for driving said tuning means, electronic means having an input and an output circuit, biasing means connected to said input, circuit means upon which a voltage is developed as the receiver is brought into an area of resonance of a station of an inverse order to the bias connected to said biasing means to cause said electronic means to cease conducting upon signal increase, a second electronic means having an input circuit connected to the output of the first, resistance means in said last connection so that as the first electronic means becomes non-conducting due to the appearance of the signal, the current through the resistor will fall, and therefore the voltage across the same to change the control bias and permit the second electronic means to conduct, and switching means controlling the power actuating means connected to the second electronic means and controlled thereby.

5. In radio receiving apparatus, power actuated tuning means to repetitively tune the receiver over a predetermined portion of the frequency spectrum, means upon which a voltage is developed in proportion to the size of an incoming signal, an electron tube having input and output circuits, biasing means connected in opposed relation between the means on which voltage is developed and the input circuit of the tube, a second tube having its input connected to the output of said first tube and controlled thereby, a third tube connected in parallel with the second, a time delay circuit in the input circuit to the third tube, and relay switching means connected to the output of the last two tubes and to the power actuated means to control the same.

6. In radio receiving apparatus, power actuated tuning means to repetitively tune the receiver over a predetermined portion of the frequency spectrum, means upon which a voltage is developed in proportion to the size of an incoming signal, an electron tube having a control grid and plate, biasing means inter-connecting said control grid and the means on which voltage is developed, said biasing means being of opposed polarity to the developed voltage, a second electron tube having a control grid and plate, means interconnecting the plate of the first tube to the control grid of the second including a condenser and relay switching means controlling said power actuated tuning means connected to the plate of the second tube so that the control exerted by the first tube on the second will be delayed and the tuner will not stop inaccurately on the weak station signals.

7. In radio receiving apparatus, power actuated tuning means to repetitively tune the receiver over a predetermined portion of the frequency spectrum, means upon which a voltage is developed in proportion to the size of an incoming signal, an electron tube having input and output circuits, biasing means connected in opposed relation between the means on which voltage is developed and the input of said tube, a second electron tube having input and output circuits, means interconnecting the output circuit of the first tube and the input circuit of the second including a condenser and relay switching means controlling said power actuated tuning means connected to the output of the second tube so that the control exerted by the first tube on the second will be delayed and the tuner will not stop inaccurately on the weak station signals, and additional switching means actuated by said relay to short out the condenser while the tuner is operating.

8. In radio receiving apparatus, power actuated tuning means to repetitively tune the receiver over a predetermined portion of the frequency spectrum, means upon which a voltage is developed in proportion to the size of an incoming signal, an electron tube having input and output circuits, biasing means connected in opposed relation between the means on which voltage is developed and the input of said tube, a second electron tube having input and output circuits, means interconnecting the output circuit of the first tube to the input circuit of the second including a condenser and relay switching means controlling said power actuated tuning means connected to the output of the second tube so that the control exerted by the first tube on the second will be delayed and the tuner will not stop inaccurately on the weak station signals, and manual switching means in the second tube output circuit to de-energize the relay and cause the tuner to proceed to the next station.

9. In radio receiving apparatus, power actuated tuning means to repetitively tune the receiver over a predetermined portion of the frequency spectrum, means upon which a voltage is developed in proportion to the size of an incoming signal, an electron tube having input and output circuits, biasing means connected in opposed relation between the means on which voltage is developed and the input of said tube, a second tube having its input connected to the output of said first tube and controlled thereby, a third tube connected in parallel with the second, a time delay circuit in the input to the third tube, relay switching means connected to the output of the last two tubes and to the power actuated means to control the same, manual switching means connected to the relay to de-energize the same and additional switching means actuated by said relay to ground the control element of the third tube while the tuning means is operating and also mute the receiver.

10. In radio receiving means, power actuated tuning means to repetitively tune the receiver over a predetermined portion of the frequency spectrum, relay switching means connected to the power actuated means to control the same, conductive means upon which a voltage is developed which is proportional to the strength of the incoming signal, multi-element electron means having an input and an output circuit, voltage biasing means connected to said conductive means upon which proportionate voltages are developed and to the input for the electron means in opposed relation to said developed voltages, means connecting the output of the electron means to the relay switching means to control the same so that as the voltage developed reaches a point at which it exceeds the biasing voltage it will control the electron means to operate the relay switching means and stop the power actuated tuning means.

11. In radio receiving means, power actuated tuning means to repetitively tune the receiver over a predetermined portion of the frequency spectrum, relay switching means connected to the power actuated means to control the same, conductive means upon which a voltage is developed which is proportional to the strength of the incoming signal, an electron tube having a control grid and plate, voltage biasing means connected to the grid and to the conductive means in opposed relation to the voltage developed thereon and means interconnecting the plate of the tube and the relay switching means so that as the developed voltage exceeds the biasing voltage, the tube will control the switching means and the tuner operation.

12. In radio receiving means power actuated tuning means to repetitively tune the receiver over a predetermined portion of the frequency spectrum, relay switching means connected to the power actuated means to control the same, conductive means upon which a voltage is developed which is proportional to the strength of the incoming signal, electronic means having a control electrode connected to said conductive means and circuit connecting means between the output of the electronic means and the relay switching means including a time delay section to prevent immediate actuation of the relay switching means upon the appearance of a stopping signal on said conductive means.

13. In radio receiving means power actuated tuning means to repetitively tune the receiver over a predetermined portion of the frequency spectrum, relay switching means connected to the power actuated means to control the same, conductive means upon which a voltage is developed which is proportional to the strength of the incoming signal, a first electronic tube having an input and output circuit, said conductive means being connected to the input circuit, a second electronic tube also having an input and output circuit, the output circuit of the second tube being connected to the relay switching means and condenser means interconnecting the output of the first tube and the input of the second tube to provide a time delay action.

BERTRAM A. SCHWARZ.
JAMES H. GUYTON.

REFERENCES CITED

The following references are of record in the file of this patent:

UNITED STATES PATENTS

| Number | Name | Date |
| --- | --- | --- |
| 2,262,218 | Andrews | Nov. 11, 1941 |
| 2,304,871 | Andrews | Dec. 15, 1942 |
| 2,487,760 | Koch | Nov. 8, 1949 |